United States Patent
Froelich

(10) Patent No.: US 9,822,627 B2
(45) Date of Patent: Nov. 21, 2017

(54) SYSTEMS AND METHODS FOR DOWNHOLE CEMENT EVALUATION

(71) Applicant: Schlumberger Technology Corporation, Sugar Land, TX (US)

(72) Inventor: Benoit Froelich, Marly-le-Roi (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 324 days.

(21) Appl. No.: 14/366,676

(22) PCT Filed: Dec. 20, 2012

(86) PCT No.: PCT/US2012/070834
§ 371 (c)(1),
(2) Date: Jun. 19, 2014

(87) PCT Pub. No.: WO2013/096565
PCT Pub. Date: Jun. 27, 2013

(65) Prior Publication Data
US 2015/0003203 A1 Jan. 1, 2015

(30) Foreign Application Priority Data
Dec. 22, 2011 (EP) .................................. 11290599

(51) Int. Cl.
*G01V 1/44* (2006.01)
*E21B 47/00* (2012.01)

(52) U.S. Cl.
CPC .......... *E21B 47/00* (2013.01); *E21B 47/0005* (2013.01); *G01V 1/44* (2013.01); *G01V 2210/127* (2013.01); *G01V 2210/1299* (2013.01)

(58) Field of Classification Search
CPC ......... G01V 1/44; G01V 1/50; E21B 47/0005
(Continued)

(56) References Cited

U.S. PATENT DOCUMENTS 3,949,352 A    4/1976  Vogel
4,254,479 A *  3/1981  Wiley ...................... G01V 1/50
                                                       175/50

(Continued)

FOREIGN PATENT DOCUMENTS

CN          1863986 A     11/2006
CN        102400679 A      4/2012
(Continued)

OTHER PUBLICATIONS

First Office Action issued in related CN Application No. 201280070192.2 dated Nov. 26, 2015, with English translation by agent (17 pages).

(Continued)

*Primary Examiner* — Ian J Lobo
(74) *Attorney, Agent, or Firm* — Michael Dae

(57) ABSTRACT

Systems and methods for cement evaluation by determining a shear velocity of a shear wave (26) propagating within a medium (20) located between a formation (12) and a casing (13) in a borehole (11) are presented. The method can include positioning an ultrasonic transducer array (21) in the borehole inside the casing. The method can also include in a pushing mode, generating a shear wave in the medium with the ultrasonic transducer array inside the casing. The method can also include in an interrogation mode, measuring a shear velocity of the shear wave in the medium with the ultrasonic transducer array. The shear velocity may be used to determine whether the medium is solid or liquid.

11 Claims, 6 Drawing Sheets

(58) Field of Classification Search
USPC .................................. 367/31, 35, 75; 181/105
See application file for complete search history.

(56) References Cited

U.S. PATENT DOCUMENTS

| | | | | | |
|---|---|---|---|---|---|
| 4,255,798 | A | * | 3/1981 | Havira | E21B 47/0005 181/105 |
| 4,709,357 | A | * | 11/1987 | Maki, Jr. | G01V 1/48 181/105 |
| 4,843,598 | A | * | 6/1989 | Medlin | G01V 1/284 367/27 |
| 5,168,470 | A | * | 12/1992 | Dennis | G01V 1/52 181/104 |
| 5,402,392 | A | * | 3/1995 | Lu | G01V 1/46 166/254.2 |
| 6,018,496 | A | * | 1/2000 | Stanke | E21B 47/0005 181/105 |
| 2005/0190648 | A1 | * | 9/2005 | Tang | G01V 1/50 367/35 |
| 2006/0198243 | A1 | * | 9/2006 | Tang | G01V 1/50 367/35 |
| 2006/0233048 | A1 | * | 10/2006 | Froelich | G01V 1/50 367/35 |

FOREIGN PATENT DOCUMENTS

| | | |
|---|---|---|
| EP | 0549419 | 4/1998 |
| EP | 0837217 | 4/1998 |
| EP | 1505252 | 2/2005 |

OTHER PUBLICATIONS

Zhu et al., "Direct Shear Wave Logging by Dipole Sound Source", Technical Acoustics, vol. 10, No. 2, Dec. 31, 1991, pp. 53-58.

* cited by examiner

SYSTEMS AND METHODS FOR DOWNHOLE CEMENT EVALUATION

BACKGROUND

Acoustical investigation can be used to investigate casings and mediums used in completions of boreholes. Oilfield acoustical investigation may involve, for example, the use of ultrasonic waves.

In the context of wellbore completions, boreholes penetrating an earth formation may include a formation wall with a casing disposed therein. An annular space (or annulus) positioned between the formation wall and the casing may be filled with a medium made of various materials, such as cement, drilling fluids, muds and/or other annulus solids. After the medium has set in the annular space, acoustic testing methods may be used to evaluate the integrity of the medium. The medium may impose zonal isolation between different formations in order to avoid flow of fluids (e.g., water, gas, oil) from the formations through the annular space of the casing. Medium placement and integrity may also affect a well's architecture, for example, to ensure mechanical support of the casing and/or to provide protection from corrosion.

Cement evaluation may be used to determine, for example, a location and/or presence of various materials that form the medium in the annular space. Various tools, such as those using acoustic waves, may be used to probe the medium outside the casing. These tools may probe based on the shear impedance of the medium (roughly the product of the density of the medium and the shear velocity of the acoustic waves), compressional impedance of the medium (roughly the product of the density of the medium and the longitudinal velocity of the acoustic waves), and/or combinations thereof. Such evaluation may be used to detect potential problems that may arise, for example, when a bond between the medium and the casing has failed, when the medium has not fully set, when light weight and/or low density cements are used in the medium, and other practical scenarios in which conditions are less than ideal, thus potentially leaving a range of annulus solids in the medium.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, a method is presented for cement evaluation by determining a shear velocity of a medium located between a formation wall and a casing in a borehole. The method can include positioning an ultrasonic transducer array in the borehole inside the casing. The method can also include, in a pushing mode, generating a shear wave in the medium with the ultrasonic transducer array inside the casing. The method can also include, in an interrogation mode, measuring a shear velocity of the shear wave in the medium with the ultrasonic transducer array.

The method can further involve measuring a shear velocity of particle motion in the medium, and determining whether the medium is solid or liquid based on the shear velocity measured. Optionally, the method can include generating an image representative of the state of the medium at a plurality of positions.

BRIEF DESCRIPTION OF THE DRAWINGS

Embodiments of methods and apparatuses for cement evaluation are described with reference to the following figures. Like numbers are used throughout the figures to reference like features and components.

DETAILED DESCRIPTION

Figure 1:
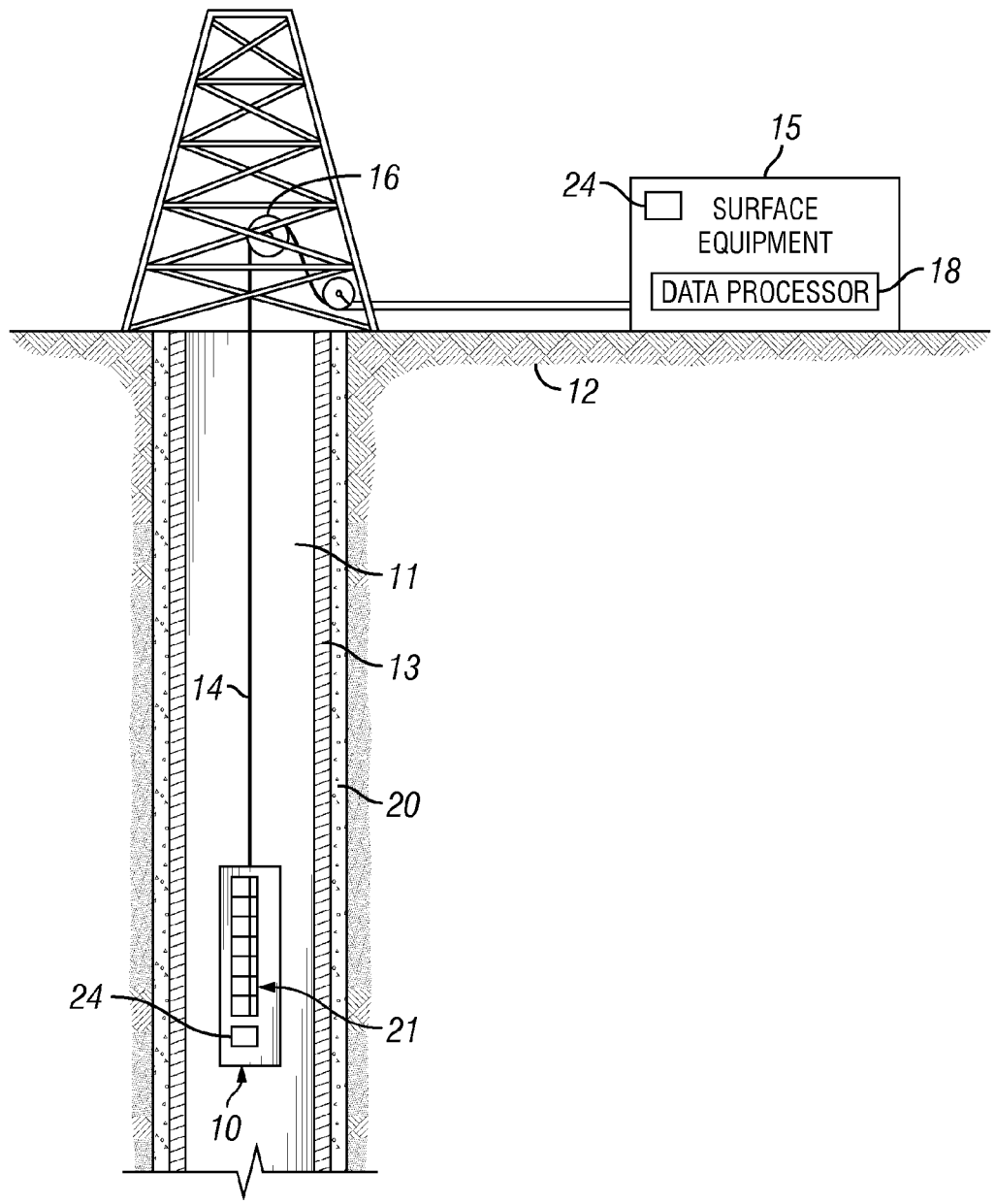
FIG. 1 is a schematic diagram showing an example of a wellsite with an acoustic logging setup.

In the following description, numerous details are set forth to provide an understanding of the present disclosure. However, it will be understood by those skilled in the art that the present disclosure may be practiced without these details and that numerous variations or modifications from the described embodiments are possible.

The disclosure relates to cement evaluation using acoustic imaging. Such imaging may be used to evaluate qualities of a medium in an annulus between a casing and a formation surrounding a cased wellbore.

As referred to herein, a cased wellbore refers to a borehole drilled in a geological formation, with a fluid-filled casing disposed in the wellbore, and a medium disposed in an annulus between the casing and the formation. The wellbore may be a production well, namely a well producing hydrocarbons flowing towards the surface, or an injection well, namely a well into which fluid is injected from the surface towards the geological formation.

As referred to herein, a shear wave may refer to a transverse wave that occurs in a medium when the medium is subjected to shear, or transverse internal forces, without changing volume of the medium. If the medium is elastic, each layer may resume its original shape after shear, adjacent layers may undergo shear, and the shifting may propagate as a wave in the medium. The velocity (v) of a shear wave equals the square root of the ratio of shear modulus (G), a constant of the medium, to density (ρ) of the medium, $v=\sqrt{G/\rho}$.

A cement evaluation tool and method for cement evaluation are described here providing a measurement of shear velocity within the bulk of the annulus that is relatively insensitive to the casing/medium bond. Whenever the shear velocity exceeds a threshold value (such as, for example, on the order of from about 10 to about 100 m/s), then the shear strength of the material under assessment may be considered sufficient to provide good zonal isolation. A measurement of shear velocity may provide a contrast between a liquid annulus (Vs~0 m/s) and a solid annulus (Vs>100 m/s) that can be used to generate an image of the medium behind the casing.

Acoustic imaging based on shear velocity may be used in cement evaluation. In such cases, a measurement of shear wave velocity at a point (or a plurality of points) in an annulus behind a casing may be provided, and thereby whether a medium disposed in the annulus is a liquid or a solid due to the degree of contrast may be determined. An acoustic impedance of the casing may affect propagation of acoustic waves to and from the annulus. When the acoustic waves have a frequency that is the same as or similar to the resonance frequency for casing thickness, however, the casing can be acoustically transparent, that is, the casing made of a highly contrasting material may have little or no effect on the propagation of the acoustic waves.

Drilling mud can attenuate high frequency ultrasonic waves. For this reason, the frequency of shear wave velocity imaging used for borehole cement evaluation may be designed to a resonance casing frequency or a harmonic thereof for maximum shear wave generation and detection.

Acoustic waves having a frequency on the order of 2 MHz may not propagate through high-density muds. For this reason, the frequency of such a shear wave may be relatively low compared to the beam frequencies used in other applications, because shear wave attenuation can be high and increasing with frequency, while the shear wavelength may be small due to low velocity (at about 1 kHz, with a velocity of about 10 m/s, the wavelength is about 1 cm). In an embodiment, it is feasible to apply a static deformation (i.e., zero frequency).

Turning now to FIG. 1, a schematic diagram of an example acoustic logging operation for cement evaluation in a completed well is shown. Downhole tool, or sonde, 10 is located in borehole 11 penetrating earth formation 12. Casing 13 is cemented to borehole walls via a medium 20. The sonde 10 can be lowered into the borehole 11 by armored multi-conductor cable 14 (though any other manner of conveyance is envisioned here as well, such as coiled tubing, drill pipe, casing-while-drilling pipe, tubulars, etc.) and raised out of the borehole 11 by surface equipment 15 over sheave wheel 16 while acoustic measurements are performed.

Sonde 10 can include an array 21 that includes a plurality of axially spaced acoustic transducers, and a controller 24 (positionable in the sonde 10 and/or surface equipment 15) for controlling the operation of various components of the sonde 10 including the array 21. The transducers can be configured to detect, for example, formation compressional waves, formation shear waves, cement compressional waves, and cement shear waves. Such detections can be performed following drilling or intermediate drill string trips by wireline logging operations, for example.

In addition to wireline logging, the array 21 can be embedded in drill string segments for logging-while-drilling operations. Thus, while the particular embodiment shown in FIG. 1 is a wireline operation, the present disclosure extends to logging-while-drilling or other oilfield operational scenarios as well. Additionally, while the sonde 10 is depicted as a wireline tool, the sonde 10 may be a drilling tool such as logging-while-drilling or measurement-while-drilling tool, coiled tubing tool, testing tool, completions tool, production tool, and/or other downhole tool. The array 21 can comprise an ultrasonic downhole tool of piezoelectric or piezocomposite transducers, such as the transducers used, for example, in ULTRASONIC IMAGER™ (or USI™) commercially available from SCHLUMBERGER™, or any other array of piezoelectric or piezocomposite transducers and any combination of monopole and dipole transducers in an ultrasonic scanner capable of generating a shear wave in the medium 20 from inside the casing 13 by focusing an ultrasonic beam in the medium 20.

The array 21 can be configured, for example, in two operational modes: a "pushing" mode and an "interrogation" mode as will be described further herein. The array 21 may be configured to switch substantially instantaneously between the pushing and interrogation modes for activation and propagation of resulting shear waves substantially in real time.

In various embodiments, the array 21 can output and focus an acoustic (e.g., ultrasonic) beam into the medium 20 and detect any return waveforms with any one or more of its transducers. For example, the array 21 can emit modulated acoustic excitation pulses and detect the return waveforms produced as a result of acoustic excitations interacting with the casing 13 and/or the medium 20. In some embodiments, the return waveforms detected can be stored in a memory located in the sonde 21 for later retrieval and analysis by data processor 18. One or more data processors 18 may be positioned, for example, in the sonde 21 as shown, and/or in surface equipment 15 and/or at a remote location). In some embodiments, the return waveforms can be sent to the surface via a communication link (e.g., cable 14 or a telemetry system) for analysis by data processor 18 or by another process at a remote location. In some embodiments, data processor 18 may be disposed in the sonde 10 so that the return waveforms can be analyzed in-situ by data processor 18 downhole.

Analysis of the return waveforms detected can provide information on cement quality such as, for example, whether the medium is in a liquid or solid state, whether a set medium may contain fluid such as drilling mud, and the like. The surface equipment 15 may be used to generate various outputs. For example, an output of processing, regardless of whether performed downhole in real-time or later at the surface or a remote location, may be an interpreted image of the medium 20 immediately behind the casing 13. In some embodiments, the image produced may be in two dimensions, while in other embodiments, the image produced may be in three dimensions. In various embodiments, the acoustic measurements for evaluating cement quality can be performed azimuthally.

Figure 2:
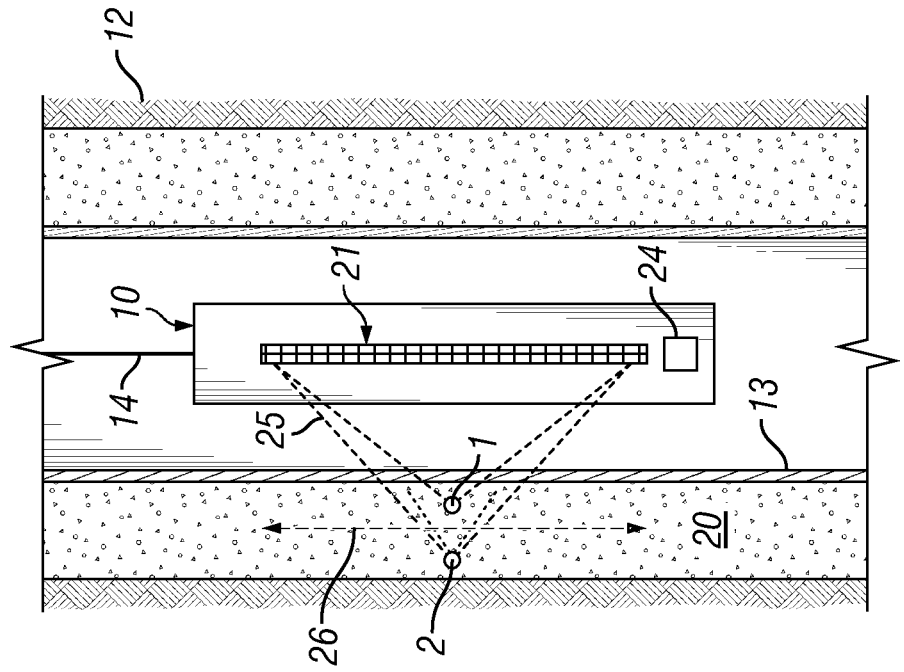
FIG. 2 shows a schematic diagram depicting an example of an ultrasonic transducer array that can be used to generate a point shear wave source resulting in a dipole wavefront pattern in a medium about a casing in accordance with an embodiment of the present disclosure.
Figure 3:
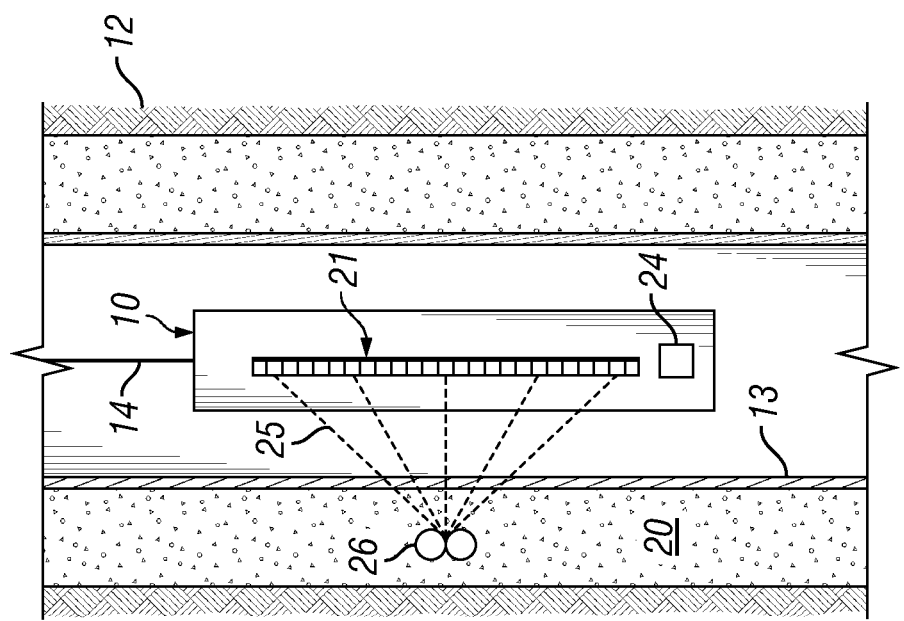
FIG. 3 shows a schematic diagram depicting an example of an ultrasonic transducer array that can be used to generate a fast moving radiation point force resulting in a conical wavefront pattern in the medium about a casing in accordance with an embodiment of the present disclosure.

Logging operations, such as the one depicted in FIG. 1, may be used to generate shear waves in the medium using a "pushing mode" as schematically depicted in FIGS. 2 and 3. Turning now to FIG. 2, in "pushing" mode, the array 21 in the sonde 10 can be driven by controller 24 (either downhole processing or as part of surface equipment 15 of FIG. 1) to create a point force by focusing ultrasonic beam(s) 25 generated by the array 21, and modulating the ultrasonic beam(s) 25 to generate a shear wave 26 in the medium 20 beyond the casing 13. The shear wave 26 with low frequency (on the order of from about 10 to about 1000 Hz) can be generated with the array 21 when the ultrasonic beam(s) 25 is focused inside the medium. The focused high intensity ultrasonic beam 25 creates a point force that can be modulated in amplitude to generate the low frequency shear wave. As demonstrated by FIG. 2, a point force can radiate a shear wave with a dipole radiation pattern, with maximum amplitude in the vertical direction.

Referring to FIG. 3, in "pushing" mode, the array 21 in the sonde 10 can be driven by controller 24 in such a way that a focal point is rapidly moved along a horizontal line perpendicular relative to the array 21, instead of having a fixed focus. In an embodiment such as that shown in FIG. 3, the array 21 can be driven by controller 24 to successively focus the ultrasonic beam(s) 25 at different radial depths, such that resulting shear waves constructively interact along a cone as shown. In the plane of the array 21 and the focal line, the overall effect of the cone of constructively interacting beams 25 is to generate two plane shear waves 26 propagating in opposite directions from one another. The ultrasonic beam(s) 25 may be moved at a rate faster than the shear wave speed in the shear waves 26.

In the example shown in FIG. 3, the point force can be driven from a first point 1 to a second point 2 by varying the ultrasonic beams 25 produced and focused by the array 21 in the sonde 10. The resulting shear waves 26 in the medium 20 propagate out away from the cone in directions opposite from one another, parallel to the array 21. By varying the speed at which the focal point is moved by driving the array 21 with the controller 24, the shear waves 26 can be steered in various different directions, thereby investigating the medium 20 behind the casing 13 from various angles of view.

The acoustic impedance of casing may affect the quality of transfer of acoustic waves to the annulus. At or about the casing thickness resonance frequency, however, casing acts as if acoustically transparent. Since generating a point force can be performed without a wide band signal, the frequency of operation can be designed at the fundamental resonance frequency or its harmonics (multiples) for maximum amplitude in shear wave generation. If the ultrasonic array 21 is not in direct contact with casing 13, then the ultrasonic beam 25 may propagate within the attenuating mud inside the casing. In an embodiment, to avoid excessive attenuation, the lowest frequency of operation can be selected, such as the fundamental resonance frequency. A difference between the operational frequency and the resonance frequency of the casing can be, for example, 5% or less, 3% or less, 1% or less, or the same frequency.

In "interrogation" mode, the array 21 can measure the shear velocity of the shear wave(s) 26 in the medium 20. Specifically, once the shear wave(s) 26 is launched, the array 21 can stop transmitting the "pushing" ultrasonic beam and switch to interrogation mode. Scatterers induced in the medium by the shear wave can be detected along the direction of shear wave propagation for measurement relating to the shear wave velocity and attenuation. Scatterers are measurable particle motion within the medium.

Figure 4:
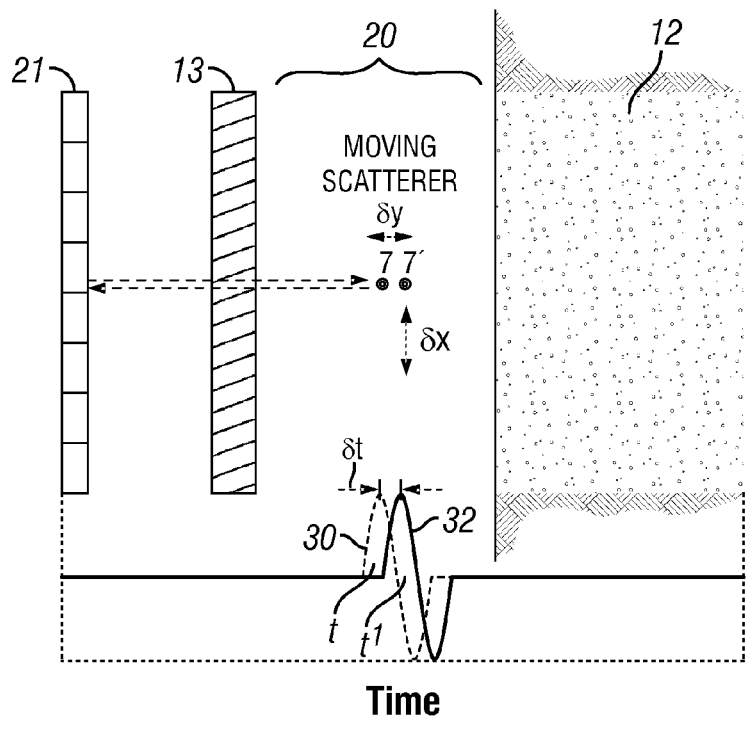
FIG. 4 shows a schematic diagram illustrating an example of FIG. 2 with a single scatterer located in the annulus, and the corresponding ultrasonic waveforms when the scatterer is displaced by an incoming shear wave.
Figure 5:
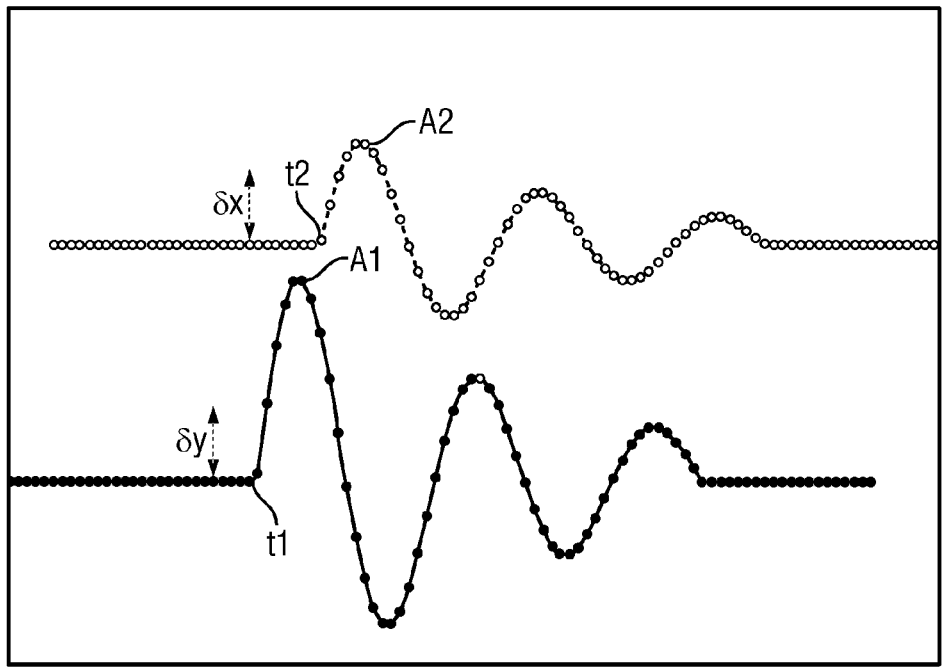
FIG. 5 is a graph illustrating an example of "interrogating" ultrasonic waveforms recorded at a particular location at two instances in time.
Figure 6:
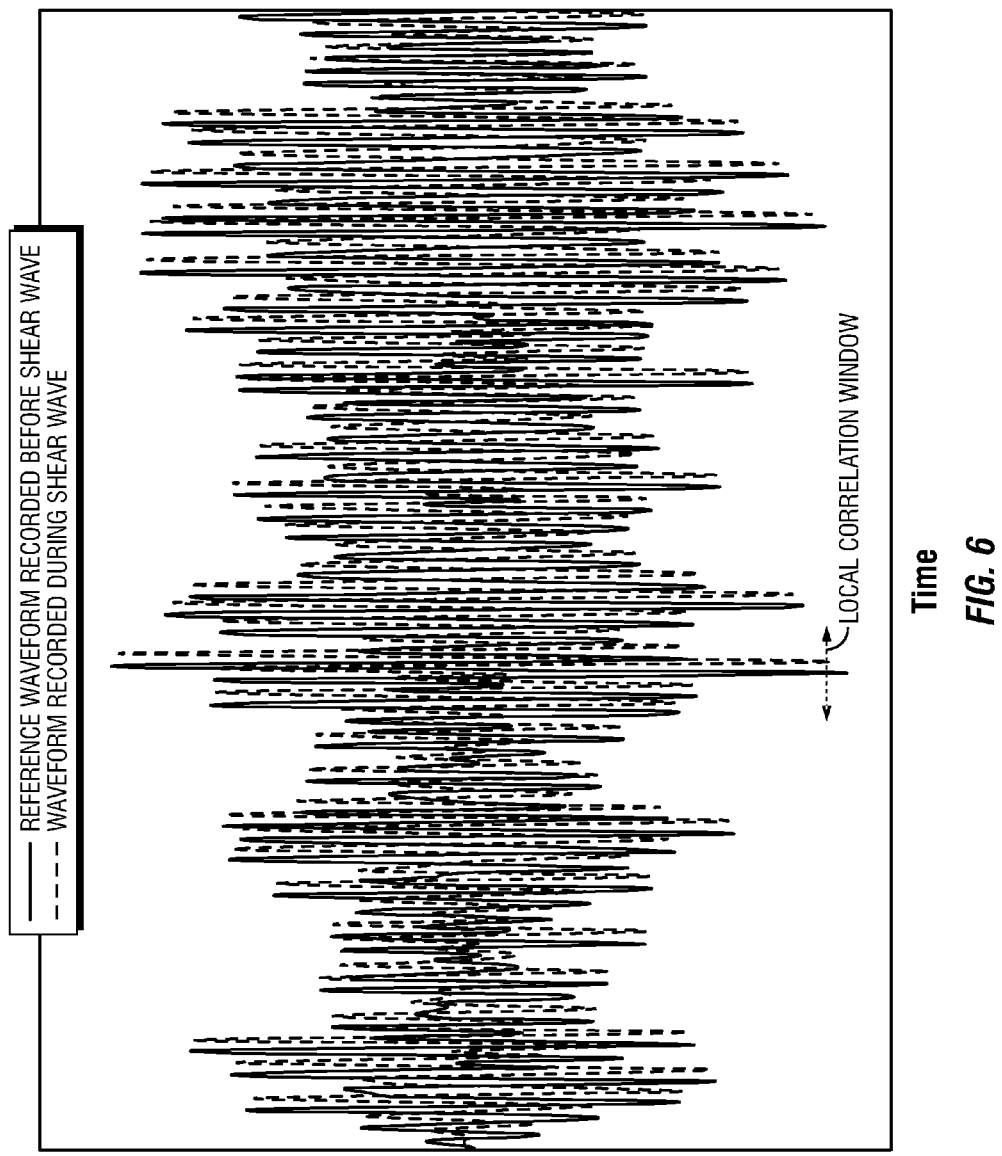
FIG. 6 is a graph illustrating an example plot of constructed displacement waveforms at two locations separated by distance $\delta x$, and showing shear waveforms time of arrival of respectively $t_1$ and $t_2$.

FIGS. 4-6 depict waveforms generated by the array 21 at various positions and times. FIG. 4 is a plot of magnitude of an echo (y-axis) against time (x-axis), depicting the "interrogation" mode for the array 21 positioned adjacent casing 13, medium 20 and formation 12. In "interrogation" mode, the array 21 repetitively sends an ultrasonic plane wave to the annulus as indicated by the arrow moving away from the array 21. Where a single scatterer (at position 7) is present in the annulus (FIG. 4), the scatterer reflects an echo onto the array 21 as indicated by the arrow moving toward the array 21, and by waveform 30.

A time t of arrival of the echo is related to the distance between the array 21 and scatterer 7. If the shear wave propagates in the annulus in the vertical direction (see, e.g., FIG. 2), a horizontal displacement δy of the scatterer will be induced, moving the scatterer from position 7 to 7'. When a new plane wave is emitted by array 21, the echo generated by the scatterer at position 7' will be shifted in time compared to the original waveform 30 by an amount δt related to the displacement, as shown by a second waveform 32. Measuring the δt for the echo may be used as an estimate of a measurement δy relating to particle displacement between position 7 and 7' of the scatterer.

The interrogation of FIG. 4 can be repeated at a rate higher than a period of the excited shear wave as shown by waveforms A1 and A2 of FIG. 5. The displacement history at a position of the scatterer (shown dimensionless) can be reconstructed versus time in seconds as shown in the waveforms A1 and A2. These waveforms A1 and A2 define a time of arrival $t_1$ for the shear wave at the first position 7 of the scatterer.

If the same sequence of operation is performed at the second position 7' of the scatterer, at a distance δx from the first waveform, the second displacement is time shifted by an amount:

$$(t_2 - t_1) = \delta x / v, \qquad \text{Equation (1)}$$

where v represents a measurement of shear velocity. The local shear velocity between two scatterers of the particle motion can thus be inferred from the knowledge of $(t_2-t_1)$ and δx. In addition, comparing the amplitudes of the two waveforms $A_1$ and $A_2$ allows for computation of the attenuation $A_2/A_1$.

Scatterers may be naturally present in portions of the medium, such as cement slurry or mud, due to suspended solid particles. In light mediums, scatterers, in addition to those naturally present in the materials of the medium, may be due to hollow spheres added to decrease the medium density. To achieve sufficient amplitude for back scattered echoes, the ultrasonic interrogating beam can operate at a high enough frequency, for example 1 MHz or above, depending on the actual size of the particles. To avoid excessive acoustic energy loss in crossing the casing, the frequency of operation may be at the casing thickness resonance or its harmonic.

The waveform of FIG. 4 depicts an example of a single scatterer. Cases with multiple scatterers, such as scatterers distributed within a volume of the annulus, may differ from the example shown in FIG. 4. FIG. 6 depicts waveforms in an embodiment with multiple scatterers. In the example of FIG. 6, distinct echoes are not time separated. In this case, successive waveforms recorded at successive instants are stored and processed by local correlation between two waveforms. One of the two waveforms can be a waveform recorded before the shear wave launch, as the reference waveform. The other waveform may be recorded during the shear wave at a second instance. A local correlation window may be used to get a local particle (i.e., scatterer) displacement at the second instant with respect to the reference state. Such local correlation can enable the construction of a displacement waveform such as shown on FIG. 6. Changing the position of the correlation window may allow for probing the annulus in the radial direction.

In the previous description, the scatterer displacement waveforms can be constructed at two positions, for example by recording the waveforms on various elements of the array 21 in facing positions as shown, for example, in FIGS. 4 and 5. With an array 21 having a plurality of elements or transducers, however, the scatterer displacement and shear wave velocity can be estimated over the vertical extent of the array for a single "pushing" event.

Figure 7:
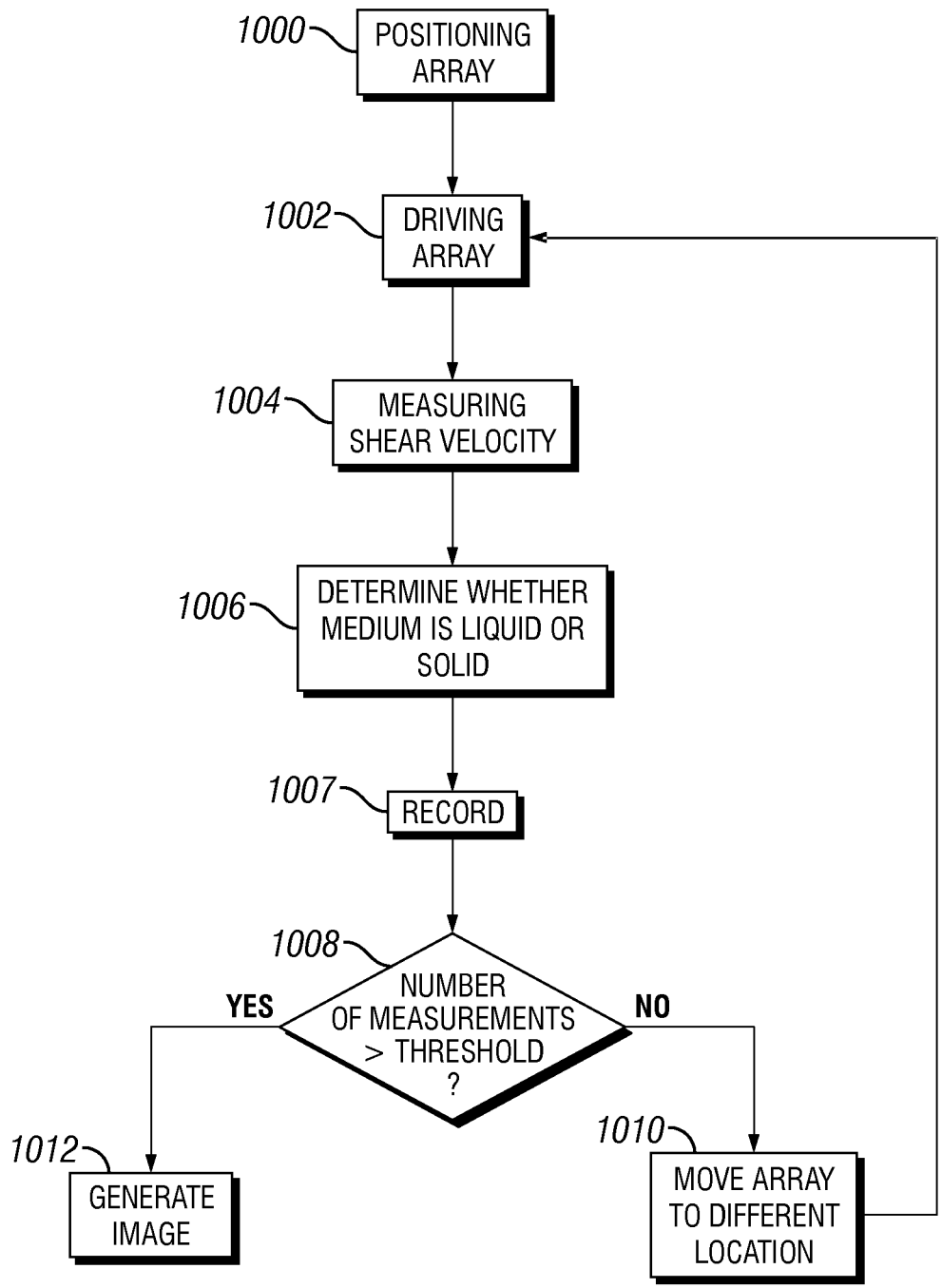
FIG. 7 shows a flow chart of a method of cement evaluation in accordance with an embodiment of the present disclosure.

Turning now to flowcharts for various embodiments of the methods of downhole cement evaluation presented, FIG. 7 begins with positioning (1000) an ultrasonic transducer array in a cased borehole having a medium between the casing and a formation wall (see, e.g., FIG. 1). The method includes driving (1002) an array to produce an output beam that generates a shear wave in the medium (see, e.g., FIGS. 2 and 3).

The driving 1002 can include simultaneously activating various ones or pluralities of the transducers of the array to focus the output beam into a point force in the medium (e.g., focused from within the casing in the borehole). The driving 1002 may also include modulating the output beam to produce a shear wave in the medium. In one embodiment, the frequency used to drive, for example, may be less than about 1 kHz. In another embodiment, the transducer may be approximately matched to the resonance frequency of the casing, or a harmonic thereof, such that the casing is effectively transparent sonically. The driving 1002 may also include modulating the output beam to produce a shear wave in the medium at a particular frequency. In one embodiment, the shear wave has a low frequency, less than about 1 KHz.

The method proceeds with measuring (1004) the shear velocity of particles (i.e., scatterers) moving in the medium due to the shear wave. In one embodiment, the same ultrasonic transducer array both creates the shear wave in a pushing mode as well as measures the resulting shear velocity of scatterers moving in the medium in an interrogating mode (see, e.g., FIG. 4). From the measured shear velocity, the method includes determining (1006) whether the medium is a liquid (i.e., drilling fluids, water or other fluid from the formation, or improperly or incompletely cured cement) or a solid. The measured shear velocity and determination of state are recorded (1007). In one embodiment, the determining (1006) and recording (1007) may occur in processor(s) (e.g., 18 of FIG. 1).

At (1008), a determination may be made as to whether a threshold number of measurements of shear velocity have been obtained in order to generate an image of the medium behind the casing with desired resolution. If no, the method proceeds to moving the array to a different location in the borehole (1010) and iterating the driving (1002), measuring (1004), determining (1006), and recording (1007). If yes at 1008, the method further includes generating (1012) an image. In one embodiment, the threshold number of measurements may be sufficient to generate an image adequate for making real-time decisions regarding the well. In another embodiment, a higher threshold number of measurements may be obtained to generate a three dimensional image, or a two dimensional image of higher resolution. The image may be produced in a computer user interface or generated for production as a hard or soft copy for analysis. Any of various inversion techniques known may be used for producing the image.

Figure 8:
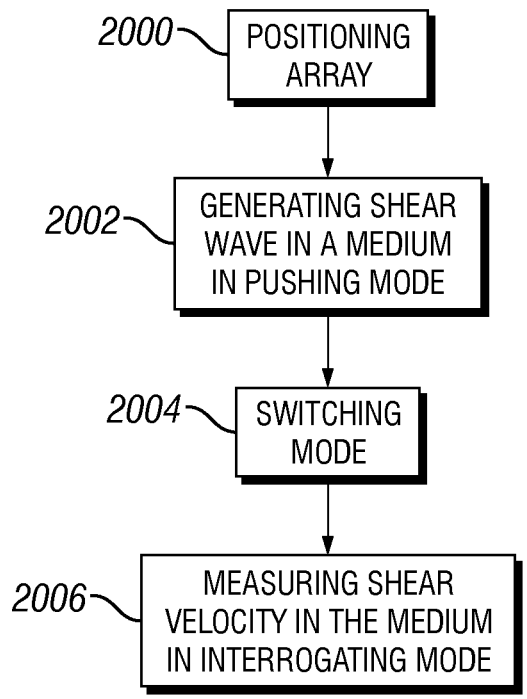
FIG. 8 shows a flow chart of another method of cement evaluation in accordance with an embodiment of the present disclosure.

Turning to FIG. 8, an embodiment of a method presented herein includes positioning (2000) an ultrasonic transducer array in a cased borehole (see, e.g., FIG. 1). The method includes in a pushing mode, generating (2002) a shear wave in a medium between the casing and a formation wall (see, e.g., FIGS. 2 and 3). In various embodiments, the pushing mode may include generating an acoustical beam with the array in the borehole inside the casing to create a point force in the medium, and modulating the acoustical beam to generate the shear wave in the medium. Such embodiments result in a dipole wavefront pattern in the resulting shear wave.

The pushing mode may include driving the array such that the point force created by focusing the beam moves along a path perpendicular to the array at a rate substantially faster than a velocity of the shear wave, like a sonic boom in flight terminology, resulting in a shear wave in the medium comprising a conical wavefront pattern. Additionally, in embodiments in which the point force is moving, the generated shear waves may be steered in a particular direction in the medium based on the speed at which the point force is controlled to move by adjusting the rate at which the array is driven. In such embodiments where the array is driven to rapidly move the point force, the rate at which the point force is displaced can be supersonic in speed relative to the velocity of the resulting shear wave.

The method includes switching (2004) the array to an interrogation mode (see, e.g., FIGS. 4 and 5). This switching (2004) may include altering which of the various transducers or combinations of transducers of the array are activated, the voltage or frequency at which the activated transducer(s) or transducer combination(s) of the array are driven, or like methods of changing the output beam. In some embodiments, the switching (2004) may occur instantaneously. The method includes measuring (2006) the shear velocity of the shear wave generated in the medium in an interrogating mode. The measuring (2006) can include launching an ultrasonic wave propagating at about 90 degrees relative to the shear wave's direction of propagation, and recording differences in echoes off scatterers, as described above.

Figure 9:
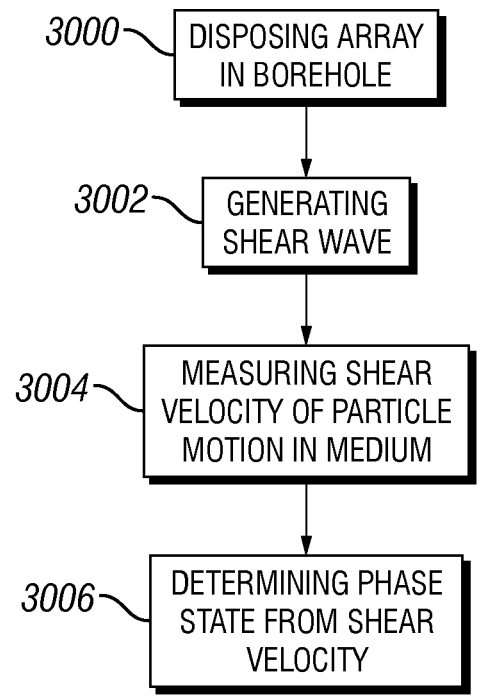
FIG. 9 shows a flow chart of yet another method of cement evaluation in accordance with an embodiment of the present disclosure.

Turning now to FIG. 9, still another embodiment of the present disclosure is shown. The method includes disposing (3000) an array in a casing in a borehole through a geological formation (see, e.g., FIG. 1). The method proceeds with generating (3002) a shear wave in the medium with an ultrasonic wave having a frequency approximately the resonant frequency of the casing or a harmonic of a resonant frequency of the casing (see, e.g., FIGS. 2 and 3). Such shear waves may cause scatterers within the medium.

The method includes measuring (3004) a shear velocity in the medium at a first position and determining (3006) whether the medium at the first position is solid or liquid based on the shear velocity measured. For analysis of the medium behind the casing, the method additionally can include measuring a second shear velocity in the medium at a second position; and generating an image representative of the medium indicating whether the respective medium at the first and second positions is solid medium or liquid medium based on the shear velocities measured. A measurement of shear velocity may provide a contrast between a liquid annulus (Vs~0 m/s) and a solid annulus (Vs>100 m/s) that can be used to generate an image of the medium behind the casing. In one embodiment, a few hundred measurements may be obtained as a threshold number of measurements adequate to generate an image having a high enough resolution along the length of the borehole for the kinds of applications in which such an image of cement completions is used.

While the disclosure has been disclosed with respect to a limited number of embodiments, those skilled in the art, having the benefit of this disclosure, will appreciate numerous modifications and variations therefrom. While the disclosure has been described in the context of applications in downhole tools, the apparatus of the disclosure can be used in many applications using shear velocity evaluation of a medium.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method for cement evaluation, comprising:
   disposing an ultrasonic transducer array in a casing in a borehole, the casing being secured in the borehole by a medium disposed in an annulus formed between a wall of a formation and the casing;
   generating a shear wave in the medium; by using an ultrasonic transducer array, the shear wave having a frequency within a threshold difference of one of a resonance frequency of the casing and a harmonic thereof, and causing particle motion within the medium;
   measuring a shear velocity of the particle motion in the medium; and
   determining whether the medium is solid or liquid based on the shear velocity;
   wherein generating the shear wave in the medium by using an ultrasonic transducer comprises:
      generating an acoustical beam with the ultrasonic transducer array to create a point force in the medium perpendicular relative to the ultrasonic transducer array, wherein the point force moves along a path perpendicular to the ultrasonic transducer array at a speed higher than the shear velocity of the shear wave, resulting in a conical wavefront moving in the medium; and
      driving at least one element of the ultrasonic transducer array such that the point force creates the shear wave in the medium.

2. The method according to claim 1, further comprising:
   measuring a plurality of shear velocities of the particle motion in the medium at a plurality of positions; and
   generating an image representative of the medium indicating whether the medium at the plurality of positions is solid or liquid based on the plurality of shear velocities.

3. The method according to claim 2, wherein the image comprises one of a two dimensional image representative of the medium and a three dimensional image representative of the medium.

4. The method according to claim 1, wherein generating the shear wave in the medium comprises focusing an output of the ultrasonic transducer array in the medium resulting in the point force, and modulating an amplitude for the output of the ultrasonic transducer array at a selected frequency within a threshold of 5% or less of the resonance frequency of the casing or the harmonic of the resonance frequency of the casing.

5. The method according to claim 4, further comprising driving the ultrasonic transducer array so as to move the point force along a path perpendicular to the ultrasonic transducer array.

6. The method according to claim 1, further comprising driving at least one element of the ultrasonic transducer array with a fixed focus, or using a single element transducer with the fixed focus.

7. The method according to claim 1, wherein the shear velocity of about zero meters per second indicates the medium in the annulus is liquid and the shear velocity of greater than or equal to one hundred meters per second indicates the medium in the annulus is solid.

8. A method for cement evaluation of a medium located between a wall of a formation and a casing in a borehole, wherein the medium secures the casing to the wall, comprising:
   positioning an ultrasonic transducer array in the borehole inside the casing;
   in a pushing mode,
      generating an acoustical beam with the ultrasonic transducer array to create a point force in the medium perpendicular relative to the ultrasonic transducer array, wherein the point force moves along a path perpendicular to the ultrasonic transducer array, driving the ultrasonic transducer array such that a point force creates a shear wave in the medium, the point force moving at a speed higher than the shear velocity of the shear wave, resulting in a conical shear wave moving in the medium,
      the shear wave causing particle motion in the medium; and
   in an interrogation mode, measuring a shear velocity of the particle motion in the medium with the ultrasonic transducer array.

9. The method according to claim 8, wherein the shear wave in the medium comprises a dipole wavefront pattern.

10. The method according to claim 9, further comprising modulating the acoustical beam to generate the shear wave in the medium at a selected frequency, wherein the selected frequency is equal to a resonance frequency of the casing or a harmonic of the resonance frequency of the casing.

11. The method according to claim 8, wherein the pushing mode comprises driving at least one element of the ultrasonic transducer array at a frequency that is within a threshold difference of the resonance frequency of the casing or the harmonic of the resonance frequency of the casing.

* * * * *